United States Patent [19]

Benson

[11] 4,335,083
[45] Jun. 15, 1982

[54] METHOD FOR LEACHING MAGNESIUM FROM MAGNESIUM HYDROXIDE-CONTAINING COMPOSITION

[75] Inventor: Robert F. Benson, St. Peterburg, Fla.

[73] Assignee: Carey Canada Inc., Quebec, Canada

[21] Appl. No.: 240,712

[22] Filed: Mar. 5, 1981

[51] Int. Cl.³ .............................. C01F 5/20; C01F 5/24
[52] U.S. Cl. .................................. 423/167; 423/155; 423/164; 423/165; 423/430; 423/431; 423/636; 423/638; 423/639
[58] Field of Search ............... 423/155, 164, 165, 158, 423/167, 636, 639, 430, 431, 352, 554, 497, 397, 638

[56] References Cited

U.S. PATENT DOCUMENTS

| | | | |
|---|---|---|---|
| 1,340,535 | 5/1920 | Garcin | 423/167 |
| 1,348,933 | 8/1920 | Dolbear | 423/162 |
| 1,545,132 | 7/1925 | Drambour . | |
| 1,963,493 | 6/1934 | Higgins et al. | 423/155 |
| 1,969,769 | 8/1934 | Sweet et al. | 423/165 |
| 2,039,653 | 5/1936 | MacMullin | 423/165 |
| 2,070,496 | 2/1937 | Sweet et al. | 423/165 |
| 2,390,095 | 12/1945 | Gloss | 423/165 |
| 2,402,370 | 6/1946 | Chalmers | 23/128 |
| 2,785,950 | 3/1957 | Thomsen | 23/1 |
| 2,926,997 | 3/1960 | Kalousek | 423/167 |
| 3,085,858 | 4/1963 | Trubey et al. | 23/129 |
| 3,215,494 | 11/1965 | Hemstock | 23/110 |
| 3,914,184 | 10/1975 | Harada et al. | 252/457 |
| 4,201,750 | 5/1980 | Pitts | 423/175 |
| 4,277,449 | 7/1981 | Lalancette | 423/554 |

FOREIGN PATENT DOCUMENTS

| | | | |
|---|---|---|---|
| 530364 | 9/1956 | Canada | 423/164 |
| 641760 | 5/1962 | Canada | 423/158 |
| 715473 | 8/1965 | Canada | 423/164 |
| 1034385 | 7/1978 | Canada | 53/308 |
| 257084 | 8/1926 | United Kingdom | 423/165 |
| 529614 | 11/1940 | United Kingdom | 423/155 |

OTHER PUBLICATIONS

Article entitled "Preference accordee aux enterprises locales" which appeared in Canadian newspaper, Courrier Frontenac, Jan. 29, 1980, p. 12.

Primary Examiner—O. R. Vertiz
Assistant Examiner—Wayne A. Langel
Attorney, Agent, or Firm—James W. Grace; Charles W. Vanecek

[57] ABSTRACT

A method for leaching magnesium from a magnesium hydroxide-containing composition, especially a mineral, which comprises contacting said composition with an aqueous solution of an ammonium salt whose corresponding magnesium salt is soluble in said aqueous solution to thereby produce said soluble magnesium salt; separating said aqueous solution from said composition; and transforming the magnesium of said soluble magnesium salt into an insoluble magnesium compound. The method is particularly useful for leaching magnesium from brucite-containing chrysotile asbestos fibers, to yield both a magnesium compound and brucite-free, dispersed chrysotile fibers.

16 Claims, 1 Drawing Figure

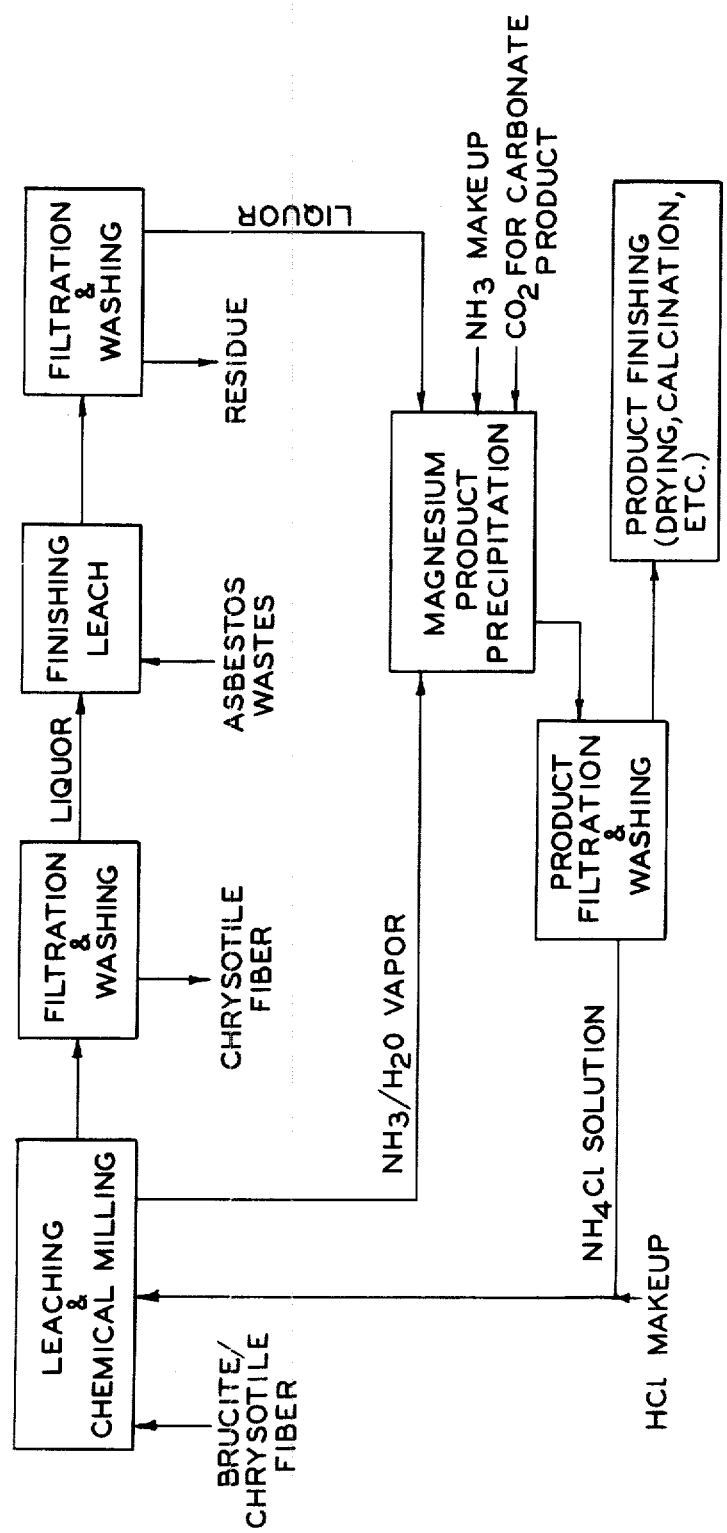

METHOD FOR LEACHING MAGNESIUM FROM MAGNESIUM HYDROXIDE-CONTAINING COMPOSITION

BACKGROUND OF THE INVENTION

1. Field of the Invention

This invention relates to the extraction of magnesium chemicals from brucite bearing minerals. In particular, the invention is concerned with the selective extraction of the brucite mineral fraction from chrysotile asbestos by chemically opening the chrysotile asbestos fiber bundles and recovering the magnesium, which is thereby leached in a relatively pure form as a magnesium compound.

2. Description of the Prior Art

Brucite is a magnesium bearing mineral having the chemical formula $Mg(OH)_2$. Its high magnesia content (69% MgO) and high chemical reactivity make it a desirable source for magnesium chemicals. It is frequently found in association with other magnesium bearing minerals, such as magnesite and chrysotile. When brucite is associated with chrysotile asbestos fibers, it is an undesirable impurity because it imparts undesirable physical and chemical properties to the chrysotile asbestos fibers and because its presence in the deposit increases the severity of the processing required to extract the chrysotile asbestos fibers. Brucite is more brittle and chemically more reactive than chrysotile. The high chemical reactivity of brucite leads to a less stable chrysotile fiber in acid environments.

Conventional processing of chrysotile asbestos involves the physical crushing and sizing of the chrysotile bearing rock in order to open the fiber bundles and release the fibers. Chrysotile fibers have several mineral variations which relate to the ease of processing and to the amount of brucite present as a binder material in the bundles of chrysotile fibers. If the chrysotile fiber bundles are oriented perpendicular to the axis of the mineral vein, they are described as "cross" fibers. If the chrysotile fiber bundles are oriented parallel with the vein of the mineral deposit, they are termed "slip" fibers. Slip fibers tend to have brucite associated with the fiber bundles in such a manner as to act as a binder for the chrysotile fibers. The presence of the brucite in the slip fiber asbestos results in a more severe processing requirement to extract the chrysotile and a lower value fiber product. It would be desirable if an effective means could be found to separate the brucite from the chrysotile without damaging the chrysotile fibers.

Prior art in the extraction of magnesium from serpentine ore sources is limited to processing which is either severe enough to extract the magnesium from both the chrysotile and brucite or ineffective for selectively leaching magnesium from the brucite present in chrysotile. According to Canadian Pat. No. 1,034,385, serpentines have been treated with hydrochloric acid to extract about 95% of the available magnesium in the ore, and this extracted magnesium is then recovered as a caustic calcined or reactive magnesia. Another process for the extraction of magnesium from serpentine wastes is based upon the heat treatment of both chrysotile and brucite minerals with a mixture of crystalline ammonium sulfate in order to convert the magnesium in the minerals to a water soluble magnesium sulfate. The choice of ammonium sulfate as part of the mixture in the heat treatment is unique in that other ammonium salts lead to magnesium salts that decompose at the temperature of heat treatment or lead to undesirable side reactions. The magnesium sulfate is leached from the heat treated material with water and the soluble magnesium is recovered as a magnesium compound. Because of the severity of the reaction conditions necessary to form the magnesium sulfate in this process, the chrysotile mineral is destroyed either totally or in part during the heat treatment. Aqueous carbon dioxide is known to leach magnesium from brucite and magnesite minerals but the process is such that carbon dioxide leaching is not suitable for materials having low brucite or magnesite contents.

OBJECTS OF THE INVENTION

It is, therefore, an object of this invention to provide a method for leaching magnesium from brucite containing compositions, especially minerals such as those containing a mixture of magnesium bearing compositions, and for recovering the magnesium extracted thereby as a relatively pure magnesium compound.

It is another object of this invention to provide a method whereby magnesium can be selectively leached from the brucite component of chrysotile asbestos without further leaching of the magnesium from the chrysotile.

It is a further object of this invention to chemically mill a brucite contaminated mineral, especially brucite-containing chrysotile asbestos fibers, by a selective leaching process which accomplishes the removal of the brucite from and the dispersion of the leached mineral product.

It is yet another object of this invention to provide a method of increasing the stability of chrysotile fiber by removal of brucite from the fiber.

These and other objects and advantages of the present invention will become more apparent when the instant disclosure is read in conjunction with the accompanying drawing.

SUMMARY OF THE INVENTION

In accordance with the present invention, it has been found that magnesium may be leached from a magnesium hydroxide bearing composition, especially a brucite bearing mineral, by treating said composition with an aqueous solution of an ammonium salt capable of forming a soluble magnesium salt, and by recovering the extracted magnesium as a relatively pure magnesium compound. Examples of suitable ammonium salts include ammonium chloride, ammonium nitrate and ammonium sulfate. Advantageously, an ammonium salt solution is chosen which can selectively dissolve the magnesium hydroxide, i.e., an ammonium salt solution which is a nonsolvent for a major portion of the remainder of the composition to be leached. Preferably, a brucite containing mineral, as, e.g., chrysotile, magnesite, etc. is treated with an aqueous ammonium salt, especially aqueous ammonium chloride, to selectively extract the magnesium from the brucite. The aqueous salt treatment further serves to separate mineral fibers from one another. However, the method is not limited to extracting magnesium from minerals, but is generally applicable, extending, e.g., to its extraction from synthetically produced, crude $Mg(OH)_2$ containing compositions.

More particularly, this invention provides a method for leaching magnesium from a magnesium hydroxide-containing composition, preferably a mineral such as brucite-containing chrysotile asbestos fibers, which comprises the steps of (a) contacting said composition with an aqueous solution of an ammonium salt whose corresponding magnesium salt is soluble in said aqueous solution, said aqueous solution being a nonsolvent for a major proportion of the remainder of said composition, whereby a soluble product containing said soluble magnesium salt and ammonia and an insoluble product are formed;

(b) removing a substantial portion of said ammonia from said aqueous solution;

(c) separating said aqueous solution containing said soluble magnesium salt from said insoluble product; and (d) transforming the magnesium of said soluble magnesium salt into an insoluble magnesium product by any conventional method. The magnesium hydroxide-containing composition is contacted in either a single or multi-step operation with a sufficient amount of the ammonium salt solution to convert the magnesium hydroxide to the corresponding magnesium salt. The temperature of the ammonium salt solution is suitably from about 25° to 110° C., preferably about 100° to 110° C., and the solution is preferably either saturated or as close to saturated as feasible at the given leaching temperature.

The method is especially effective in selectively and in nearly quantitatively extracting the magnesium from the brucite fraction of a chrysotile-brucite mineral mixture by means of an aqueous solution of ammonium chloride. The chrysotile is not chemically destroyed by this treatment and receives the added benefit of having the chrysotile fiber bundles opened or chemically milled during the brucite leaching treatment. The leaching treatment further acts to improve the acid resistance of the chrysotile fiber.

The leaching chemistry involved in the invention is illustrated in the reaction of brucite with aqueous ammonium ion.

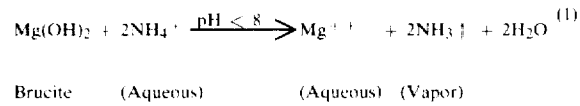

Brucite   (Aqueous)         (Aqueous)  (Vapor)

Any ammonium salt—the source of ammonium ion—which yields a soluble magnesium salt in reaction (1) can be used in the reaction. The extent of this reaction is a function of time, temperature, pH, aqueous ammonium ion concentration, and dissolved ammonia. Under optimum conditions in the practice of this invention, a brucite free chrysotile fiber product and a somewhat concentrated magnesium salt brine are produced.

Further treatment of the brine to recover the magnesium as a magnesium compound of relatively high purity leads to the regeneration of the ammonium salt solution and a magnesium compound as a second product. In the ammonium chloride treatment, the chemical reactions involved in the liquor regeneration and product recovery are either

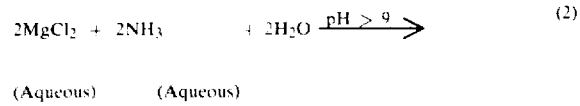

(Aqueous)  (Aqueous)

-continued

(Solid)   (Aqueous)

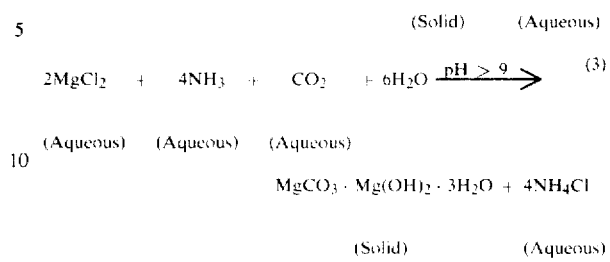

As a result of this invention, a brucite contaminated chrysotile fiber is upgraded to two higher quality products: a chemically milled, brucite-free chrysotile fiber and a relatively pure magnesium compound.

DESCRIPTION OF THE DRAWING

The invention will now be described with reference to the accompanying drawing which shows a flow sheet of the preferred embodiment of the method of the present invention for leaching brucite from asbestos.

DETAILED DESCRIPTION OF THE INVENTION

The method of the present invention comprises in general five basic steps: (1) brucite leaching from the chrysotile fiber, (2) filtration and washing of the chrysotile fiber product, (3) liquor finishing and purification, (4) precipitation of the magnesium as either a hydroxide or a carbonate, and (5) filtration and washing of the magnesium chemical product.

Treatment of the brucite contaminated chrysotile fiber both to chemically mill the fiber and to selectively leach the magnesium from the brucite fraction involves a complex leaching step. In this step, the brucite contaminated chrysotile fiber is advantageously treated with concentrated ammonium salt solution, which is preferably maintained at an elevated temperature. The ammonia produced by reaction of the ammonium salt with magnesium hydroxide can be removed from the leaching solution in any suitable manner, as, e.g., by evaporation, reverse osmosis, complexation, etc. In this way, a considerable portion of the ammonia generated in the leaching step can be removed from the leaching solution. The leaching temperature should operably be from about 25° to about 110° C., and preferably from about 100° to about 110° C. A particularly convenient slurry temperature at which to carry out leaching has been found to be about 100° C. At the higher preferred temperatures, the ammonia released according to above reaction (1) is conveniently driven out of the leaching system. The pH of the liquor tends to hold between 6.5-7.5 as a result of the ammonia evaporation.

It is desirable to use as high a concentration as possible of the ammonium salt in the leaching slurry in order to obtain suitable magnesium concentrations in the liquor for more efficient magnesium product recovery. Too high concentrations of ammonium salt, which might under certain plant conditions lead to salt precipitation and clogged production lines, should be avoided. In the case of leaching by ammonium chloride, a practical concentration of the aqueous ammonium chloride solution employed can be from about 50 to about 393 g NH$_4$Cl/l. A highly satisfactory concentration is about 393 g NH$_4$Cl/l. This concentration of the ammonium chloride solution represents saturation at 25° C. The ore being treated advantageously comprises about 5 to 28 weight percent of the leaching slurry.

As the leaching process progresses and the magnesium concentration (measured as MgO) in the liquor approaches 50 g MgO/l, the time necessary to quantitatively leach the brucite fraction becomes impractical and the solution is transferred to the finishing step. The time required to quantitatively leach the brucite fraction from an ore is proportional to the amount of brucite present in the feedstock, and for a typical brucite/chrysotile ore can be from about 0.5 to 4 hours. For a chrysotile asbestos sample having a 12% brucite impurity, the leaching residence time is approximately 0.5 hours at 100° C. After the brucite has been leached free of the chrysotile, the chrysotile fiber is filtered and washed free of the liquor by means of a suitable washing fluid such as water, at, e.g., ambient temperatures or some other suitable temperature. The chrysotile fiber is then suitable for use as a well dispersed, brucite free fiber.

Further processing of the liquor can be carried out in a finishing step involving additional brucite and/or magnesium leaching from sources including brucite enriched material, as, e.g., from asbestos wastes and tailings, or even brucite. The temperature is allowed to decrease as a result of the introduction of additional material and the ammonia is retained in the liquor in order to increase the pH. As the pH approaches 9, many of the impurities precipitate from the liquor and the brine liquor is filtered clean. At this point the brine should contain magnesium at a concentration (measured as MgO) between 70–100 g MgO/l, which represents a concentration between 50–66% of the concentration expected on the basis of the stoichiometry due to an initial ammonium chloride concentration of 393 g/l.

The magnesium can be isolated from the brine liquor by any conventional method. Advantageously, precipitation of the magnesium from the brine liquor can be carried out by the recombination of said liquor with the ammonia released in the leaching or first step. The magnesium may be precipitated as a hydroxide by means of the reaction with ammonia according to above reaction (2), or carbon dioxide may be added to the brine liquor at this point and the magnesium precipitated as a carbonate according to above reaction (3). Precipitation of the magnesium requires that the pH in the liquor be maintained above 9. Precipitation of the magnesium from the liquor regenerates ammonium chloride solution which is then ready for reuse. Chlorine can be added to the recycled ammonium chloride solution as a source of makeup chloride for production of ammonium chloride (maintenance of chloride balance). The chlorine can also assist in the oxidation of any ferrous ion present in the brine. After filtration and washing, the resulting magnesium hydroxide or carbonate is ready for further product workup as is necessary for market.

As shown in above reaction (1), the brucite reacts with ammonium chloride to release ammonia and, according to above reaction (2), the ammonia reacts with aqueous magnesium chloride to precipitate magnesium hydroxide. Therefore, the extent of brucite leaching and subsequent recovery of the magnesium compound product depend to some extent upon the displacement of reactions (1) and (2) from equilibrium by removal of ammonia from or its addition to the liquor.

Other reactions can interfere with the extent of leaching and recovery of the product. Either one or all of the following reactions could act to limit the maximum concentration of magnesium in the extract liquor.

$$MgCl_2 + NH_4Cl + 6H_2O \rightleftharpoons NH_4Cl \cdot MgCl_2 \cdot 6H_2O \quad (4)$$

(Aqueous) (Aqueous) (Crystalline)

$$MgCl_2 + 3Mg(OH)_2 + 8H_2O \rightleftharpoons 3Mg(OH)_2 \cdot MgCl_2 \cdot 8H_2O \quad (5)$$

(Aqueous) (Aqueous) (Solid)

$$3Mg(OH)_2 + MgCl_2 + 2CO_2 + 4H_2O \rightleftharpoons \quad (6)$$

(Aqueous) (Aqueous) (Aqueous)

$$Mg(OH)_2 \cdot MgCl_2 \cdot 2MgCO_3 \cdot 6H_2O$$

(Solid)

The maximum concentration of magnesium leached into the crude liquor was observed to be about 100 g MgO/l. Above reactions (4) to (6) may be involved in defining the upper limit of magnesium concentration in the brine. The crystalline ammonium chloride.magnesium chloride.hexahydrate loses water at temperatures around 100° C., a condition which may reduce the significance of above reaction (4) in the leaching at a temperature around 100° C.

During product recovery, above reactions (4), (5), and (6) may contribute impurities into the product magnesium compound and lead to ammonia and chloride losses to the process system, but recovery of the magnesium from the extract liquor by means of reaction (3) leads to magnesium carbonate of high quality (>95% MgO, ignited basis). Impurities introduced to magnesium hydroxide or magnesium carbonate by means of reaction (4), (5) or (6) are volatilized during calcination. Therefore, either reaction (2) or (3) should lead to a product from which magnesium oxide of good purity is obtained.

The following examples are given in order that the effectiveness of the present invention may be more fully understood. These examples are set forth for the purpose of illustration only and are not intended to in any way limit the practice of the invention.

EXAMPLE 1

This example illustrates the process of the invention for leaching brucite from chrysotile feedstock in a single extraction step. The chrysotile feedstock used (Feedstock Samples 1 to 7 of Table 1) had the following chemical composition in percent by weight (on a dry weight basis):

MgO—42.3
SiO$_2$—34.0
Fe$_2$O$_3$—6.3
CaO—0.1
LOI—15.0

In terms of mineral composition, this chrysotile feedstock contained approximately 12 weight % brucite and 84 weight % chrysotile, with some magnetite. Another feedstock having 89 weight % brucite (Feedstock Samples 8 and 9 of Table 1) was also subjected to brucite leaching in accordance with the process of the invention. Quantitative determination of the brucite content of the feedstock and leached extract are based upon thermogravimetric data.

Each feedstock sample to be leached was treated with an aqueous ammonium chloride solution at a concentration of 393 g/l under atmospheric pressure in a stirred vessel provided with a reflux condenser. The weight of each feedstock sample to be leached and the initial volume of the ammonium chloride solution employed in leaching the sample, as well as the temperature and time of treatment for each leached fiber sample are presented in Table 1. After the leaching treatment, the fiber was filtered and washed several times with water, and then subjected to thermogravimetric analysis to determine the % brucite leached.

As indicated in Table 1, brucite leaching from the chrysotile feedstock yielded up to about 42 and 57% brucite extraction at temperatures of 25° and 60° C., respectively. At 100° C., a practically quantitative leaching of brucite from the chrysotile feedstock was accomplished in a single extraction step.

evidenced by the concentration of magnesium (measured as magnesia) in the extract liquor after the various leaching treatments listed in Table 2. Feedstock samples 10 to 21 were leached according to the process of Example 1 under the various time, temperature and concentration conditions given in Table 2. Samples 10 to 20 were chrysotile feedstock samples having the chemical composition shown in Example 1 and sample 21 was a sample of magnesium oxide. The concentrations of magnesium (as MgO) found in the extract liquors of various leached feedstock samples of Example 1 (Samples 1, 2, 4 and 6 to 9) are included in the data of Table 2.

For an ammonium chloride concentration of 393 g/l, i.e., the concentration used in each single step leaching of Example 2, the concentration of magnesium (as MgO) that can be extracted into the liquor on the basis of stoichiometry is 148 g MgO/l. The data in Table 2 provides information suggesting the rate of leaching as well as a probable limit on the magnesium concentration in the extract liquor. The maximum concentration of magnesium (as MgO) observed in an extract liquor

TABLE 1

Brucite Leaching by Aqueous Ammonium Chloride in a Single Step

| Feedstock Sample | Weight of Feedstock (g) | Volume of NH$_4$Cl Solution (ml) | Temp. (°C.) | Time (hrs.) | Brucite Leached (wt. %) | Brucite in Feedstock (wt. %) |
|---|---|---|---|---|---|---|
| 1 | 100 | 250 | 25 | 6 | 36.5 | 11.92 |
| 2 | " | " | " | 18 | 41.3 | " |
| 3 | " | " | " | 64 | 42.5 | " |
| 4 | " | " | 60 | 6 | 48.8 | " |
| 5 | " | " | " | 24 | 56.6 | " |
| 6 | " | 500 | 100 | 2 | 100 | " |
| 7 | " | " | " | 3 | " | " |
| 8 | 32.8 | " | " | " | 68.3 | 89.0 |
| 9 | 100 | 1000 | " | 2 | 41.5 | " |

Recovery of the magnesium from the extract liquor was accomplished by carbonating the liquor at about 24° C. and atmospheric pressure. For example, carbonation of the extract liquor from feedstock sample 8 yielded a product having the following composition in percent by weight:

MgO—37.1
CaO—0.03
SiO$_2$—0.1
Fe$_2$O$_3$—0.1
LOI—62.1

EXAMPLE 2

This example illustrates the extent of single step brucite extraction in accordance with the invention, as was 95 g MgO/l for the extraction carried out at 100° C. on feedstock sample 21. This quantity is about 64% of the amount expected on the basis of stoichiometry and was obtained in a single extraction step only by using ammonium chloride solution to leach a magnesium oxide feedstock. As shown in Table 2, the rate of change in the concentration of magnesium in extraction liquors from the leaching of the brucite fraction of chrysotile fiber drops off after the concentration of magnesium (as MgO) reaches approximately 12 g MgO/l at 25° C., 17 g MgO/l at 60° C., and 16–20 g MgO/l at 100° C.

TABLE 2

Concentration of Magnesium in the Extract Liquor for Single Step Leaching

| Feedstock Sample | Weight of Feedstock (g) | Volume of NH$_4$Cl Solution (ml) | Temp. (°C.) | Time (hrs.) | Magnesium Concentration (as g MgO/l)* | Brucite in Feedstock (wt. %)* |
|---|---|---|---|---|---|---|
| 10 | 200 | 500 | 25 | 0.5 | 6.4 | 11.92 |
| 11 | 100 | 250 | " | 2 | 8.7 | " |
| 12 | 200 | 500 | " | 4 | 10.3 | " |
| 1 | 100 | 250 | " | 6 | 12.0 | " |
| 2 | " | " | " | 18 | 13.6 | " |
| 13 | 40 | " | 60 | 0.25 | 6.6 | " |
| 14 | " | " | " | " | 6.2 | " |
| 15 | " | " | " | " | 6.7 | " |
| 16 | " | 215.5 | " | 0.5 | 9.0 | " |
| 17 | 100 | 250 | " | 2 | 10.4 | " |
| 4 | " | " | " | 6 | 16.9 | " |
| 18 | " | 300 | 100 | 0.5 | 19.6 | " |

TABLE 2-continued

Concentration of Magnesium in the Extract Liquor for Single Step Leaching

| Feedstock Sample | Weight of Feedstock (g) | Volume of NH₄Cl Solution (ml) | Temp. (°C.) | Time (hrs.) | Magnesium Concentration (as g MgO/l)* | Brucite in Feedstock (wt. %)* |
|---|---|---|---|---|---|---|
| 19 | " | " | " | " | 20.4 | " |
| 20 | " | 500 | " | 1 | 17.6 | " |
| 6 | " | " | " | 2 | 16.4 | " |
| 7 | " | " | " | 3 | " | " |
| 8 | 32.8 | " | " | " | 27.5 | 89.0 |
| 9 | 100 | 1000 | " | 2 | 26.1 | " |
| 21 | 61 | 500 | " | 4 | 95.2 | 118.0** |

*Calculated from thermogravimetric analysis data.
**MgO used in place of brucite (Mg(OH)₂).

EXAMPLE 3

This example illustrates multiple step leaching of chrysotile feedstock samples by utilizing a given ammonium chloride solution to leach a series of different feedstock samples. Each feedstock sample to be leached contained approximately 12 weight % brucite and had the chemical composition shown in Example 1. Each leaching step or extraction treatment of the series was performed according to the process of Example 1 under the various time, temperature and concentration conditions given in Table 3. In the multiple step leachings, the extract liquor was filtered and the leached feedstock sample washed clean of the extract liquor from the given leaching step before the extract liquor was reused to treat a fresh feedstock sample in the next leaching step of the series. Thus, for example, the extract liquor obtained from leaching feedstock sample 22-1 of Table 3 was reused to leach feedstock sample 22-2, and the resulting extract liquor was again used to leach sample 22-3, and, similarly, for remaining series 17 (1-3), 24 (1-6), and 20 (1-3) of Table 3. The concentration of the leaching solution at the start of each series was 393 g NH₄Cl/l.

The cumulative concentration of magnesium (as MgO) present in the leaching solution at the end of each leaching step of a given series is shown in the next-to-last column of Table 3, and the % brucite leached in each of these leaching steps is shown in the last column of Table 3. Comparison of the leaching results set forth in Tables 2 and 3 shows that significantly higher concentrations of magnesium can be accumulated into the extract liquor within a given time period by means of multiple step leaching than by a single leaching step. Secondly, the extent of brucite leaching decreased with each successive leaching step. Part of the leaching effectiveness depended upon the leaching period alloted to each step, because the leaching rate can be seen to decrease with increasing magnesium concentration in the liquor.

TABLE 3

Multiple Step Leaching of Brucite By Ammonium Chloride Solution

| Feedstock Sample | Weight of Feedstock (g) | Volume of NH₄Cl Solution (ml) | Temp. (°C.) | Time (hrs.) | Magnesium Concentration* (as g MgO/l)*** | Brucite Leached** (wt. %)*** |
|---|---|---|---|---|---|---|
| 22-1 | 100 | | 25 | 2 | 13.2 | 40.0 |
| 22-2 | " | 250 | " | " | 19.5 | 26.2 |
| 22-3 | " | " | " | " | 27.4 | 17.0 |
| 17-1 | " | 250 | 60 | " | 10.4 | 31.7 |
| 17-2 | " | " | " | " | 18.3 | 23.9 |
| 17-3 | " | " | " | " | 21.4 | 9.4 |
| 23-1 | " | 300 | 100 | 0.5 | 19.6 | 71.4 |
| 23-2 | " | " | " | " | 34.2 | 60.3 |
| 23-3 | " | " | " | " | 42.7 | 54.0 |
| 23-4 | 50 | " | " | " | 49.0 | 55.1 |
| 23-5 | 100 | " | " | " | 60.5 | 55.3 |
| 23-6 | " | " | " | " | 63.1 | 47.5 |
| 20-1 | " | 500 | " | 1 | 17.6 | 95.8 |
| 20-2 | " | " | " | " | 30.9 | 88.4 |
| 20-3 | " | " | " | " | 42.9 | 83.0 |

*Cumulative concentration at end of leaching step.
**% brucite leached in individual leaching step.
***Calculated from thermogravimetric analysis data.

EXAMPLE 4

This example illustrates the effect of predissolved magnesium in the extracting liquor upon the extent of brucite leaching from chrysotile. Chrysotile feedstock samples containing approximately 12 weight % brucite and having the chemical composition shown in Example 1 were leached according to the process of Example 1 under the various time, temperature and concentration conditions given in Table 4. In each leaching, the concentration of the aqueous ammonium chloride solution was 393 g/l and the solution was loaded to the initial magnesium concentration shown in Table 4. The leaching results are presented in Table 4.

The extent of brucite leaching is again seen to be influenced by the dissolved magnesium in the extract liquor. However, a high level of brucite extraction from the chrysotile (>50%) was maintained even at a concentration of magnesium (as MgO) in the liquor of 40 g MgO/l.

TABLE 4

Effect of Predissolved Magnesium Upon Brucite Extraction by Ammonium Chloride Solution at 100° C.

| Feedstock Sample | Weight of Feedstock (g) | Volume of NH₄Cl Solution (ml) | Time (hrs.) | Magnesium Concentration (as g MgO/l)* Initial | Magnesium Concentration (as g MgO/l)* Final | Brucite Leached (Wt. %)* |
|---|---|---|---|---|---|---|
| 24 | 100 | 500 | 0.5 | 80 | 80.6 | 3.4 |
| 25 | " | " | 1 | " | 85.2 | 31.4 |
| 26 | " | " | 0.5 | 40 | 48.6 | 52.0 |
| 27 | " | " | 1 | " | 50.9 | 66.3 |
| 28 | " | " | 0.5 | 20 | 30.1 | 61.5 |
| 29 | " | " | 1 | " | 32.9 | 78.2 |

*Calculated from thermogravimetric analysis data.

EXAMPLE 5

A series of experiments were carried out for the purpose of demonstrating the chemical milling effect due to the brucite extraction from chrysotile fibers in accordance with the present invention. Samples of 4K grade chrysotile fiber (Feedstock Samples 30 to 42 of Table 5) were each leached for 2 hours at 100° C. according to the process of Example 1. The observed dispersion of the chrysotile fibers was quantified by recording the change in wet bulk volume observed for each sample.

The relative increase in wet bulk volume (shown in Table 5) of the chrysotile fibers that arises from brucite extraction is affected by the concentration of dissolved magnesium in the extract liquor in much the same way as the extent of brucite leaching is affected. Increases in the magnesium concentration in the liquor is followed by lesser degrees of improvement in the wet bulk volume of the chrysotile fiber and by a lesser extent of brucite extraction from the chrysotile.

TABLE 5

Chemical Milling of Brucite Contaminated Chrysotile Fiber
Leach Time - 2 hours; Temperature - 100° C.

| Feedstock Sample | Magnesium Predissolved in Leaching Solution (as g MgO/l) | Brucite in Feedstock (wt. %)* | Wet Bulk Volume (ml/g) Initial | Wet Bulk Volume (ml/g) Final | Wet Bulk Volume (ml/g) % Increase |
|---|---|---|---|---|---|
| 41 | — | 14.67 | 7.1 | 11.39 | 60.4 |
| 42 | — | 14.67 | 6.3 | 11.20 | 77.8 |
| 43 | 8.3 | 14.37 | 7.0 | 11.57 | 65.3 |
| 44 | 16.6 | 14.37 | 6.4 | 11.03 | 72.3 |
| 45 | 24.2 | 14.37 | 7.9 | 11.32 | 43.3 |
| 46 | 31.2 | 14.37 | 7.9 | 9.81 | 24.2 |
| 47 | 40.2 | 14.37 | 8.3 | 10.76 | 29.6 |
| 48 | 49.1 | 14.37 | 9.9 | 12.00 | 21.2 |
| 49 | — | 14.73 | 7.9 | 11.28 | 42.8 |
| 50 | — | 14.73 | 8.7 | 11.28 | 22.2 |
| 51 | — | 14.73 | 8.6 | 11.28 | 31.2 |
| 52 | — | 14.73 | 9.5 | 11.28 | 18.7 |
| 53 | — | 14.73 | 8.1 | 11.28 | 40.1 |

*Calculated from thermogravimetric analysis data.

Whereas the present invention has been described with respect to specific embodiments thereof, it should be understood that the invention is not limited thereto as many modifications thereof may be made. It is, therefore, contemplated to cover by the present application any and all such modifications as fall within the true spirit and scope of the appended claims.

I claim:

1. A method for leaching magnesium from brucite containing chrysotile asbestos fibers which comprises the steps of:

(a) contacting said asbestos fibers with an aqueous solution of an ammonium salt whose corresponding magnesium salt is soluble in said aqueous solution, said aqueous solution being a nonsolvent for a major portion of the remainder of said asbestos fibers, whereby a soluble product containing said soluble magnesium salt and ammonia and an insoluble product are formed, the magnesium of said soluble magnesium salt being derived from said brucite;

(b) removing a substantial portion of said ammonia from said aqueous solution;

(c) separating said aqueous solution containing said soluble magnesium salt from said insoluble product; and (d) transforming the magnesium of said soluble magnesium salt into an insoluble magnesium product.

2. The method of claim 1 which comprises the steps of:

(a) contacting said brucite containing chrysotile asbestos fibers with a concentrated aqueous solution of said ammonium salt at a temperature of about 25° to 110° C., whereby said soluble and insoluble products are formed;

(b) removing said substantial portion of said ammonia from said aqueous solution;

(c) separating said aqueous solution containing said soluble magnesium salt from said insoluble product; and (d) transforming the magnesium of said soluble magnesium salt into an insoluble magnesium product.

3. The method of claim 2 wherein said ammonium salt is ammonium chloride.

4. The method of claims 2 or 3 wherein said brucite containing chrysotile asbestos fibers are contacted with said concentrated aqueous solution of said ammonium salt at a temperature of about 100° to 110° C.

5. The method of claim 4 wherein said substantial portion of said ammonia is evaporated from said aqueous solution in said step (b).

6. The method of claim 1 for leaching magnesium from brucite containing chrysotile asbestos fibers which comprises the steps of:

(a) contacting said asbestos fibers at a temperature of about 25° to 110° C. with a concentrated aqueous solution of an ammonium salt whose corresponding magnesium salt is soluble in said aqueous solution, said aqueous solution being a nonsolvent for a major portion of the remainder of said asbestos fibers, whereby a soluble product containing said soluble magnesium salt and ammonia and an insoluble mineral product are formed, the magnesium of said soluble magnesium salt being derived from said brucite;

(b) evaporating said substantial portion of said ammonia from said aqueous solution;

(c) separating said aqueous solution containing said soluble magnesium salt from said insoluble mineral product; and (d) adding ammonia to said aqueous solution at a rate sufficient to maintain the pH value of said aqueous solution above 9.0 and thereby to precipitate the magnesium therefrom as magnesium hydroxide and to regenerate said ammonium salt.

7. The method of claim 6 wherein said ammonia evaporated in said step (b) is added in said step (d) and said ammonium salt regenerated in said step (d) is recycled into said step (a).

8. The method of claim 7 wherein said ammonium salt is ammonium chloride.

9. The method of claims 7 or 8 wherein said brucite containing chrysotile asbestos fibers are contacted with said concentrated aqueous solution of said ammonium salt at a temperature of about 100° to 110° C.

10. The method of claim 1 for leaching magnesium from brucite containing chrysotile asbestos fibers which comprises the steps of:

(a) contacting said asbestos fibers at a temperature of about 25° to 110° C. with a concentrated aqueous solution of an ammonium salt whose corresponding magnesium salt is soluble in said aqueous solution, said aqueous solution being a nonsolvent for a major portion of the remainder of said asbestos fibers, whereby a soluble product containing said soluble magnesium salt and ammonia and an insoluble mineral product are formed, the magnesium of said soluble magnesium salt being derived from said brucite;

(b) evaporating said substantial portion of said ammonia from said aqueous solution;

(c) separating said aqueous solution containing said soluble magnesium salt from said insoluble mineral product; and (d) adding to said aqueous solution carbon dioxide and ammonia at a rate sufficient to maintain the pH value of said aqueous solution above 9.0 and thereby to precipitate the magnesium therefrom as a magnesium carbonate compound and to regenerate said ammonium salt.

11. The method of claim 10 wherein said ammonia evaporated in said step (b) is added in said step (d) and said ammonium salt regenerated in said step (d) is recycled into said step (a).

12. The method of claim 11 wherein said ammonium salt is ammonium chloride.

13. The method of claims 11 or 12 wherein said brucite containing chrysotile asbestos fibers are contacted with said concentrated aqueous solution of said ammonium salt at a temperature of about 100° to 110° C.

14. The method of claim 1 wherein said ammonium salt is a member selected from the group consisting of ammonium chloride, ammonium sulfate and ammonium nitrate.

15. The method of claim 14 wherein said ammonium salt is ammonium chloride.

16. The method of claim 1 wherein a member selected from the group consisting of a brucite enriched composition, brucite and a mixture thereof is contacted with said aqueous solution separated in said step (c) to leach additional soluble magnesium salt into said aqueous solution; any insoluble product formed during the additional leaching is separated from said aqueous solution; and said aqueous solution is then subjected to said step (d).

* * * * *